(12) United States Patent   (10) Patent No.: US 7,881,334 B2
Yasuda   (45) Date of Patent: Feb. 1, 2011

(54) NETWORK SYSTEM, COMMUNICATION DEVICE AND PROGRAM

(75) Inventor: Masaru Yasuda, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 584 days.

(21) Appl. No.: 11/613,948

(22) Filed: Dec. 20, 2006

(65) Prior Publication Data

US 2007/0147230 A1    Jun. 28, 2007

(30) Foreign Application Priority Data

Dec. 27, 2005   (JP) .............................. 2005-374352

(51) Int. Cl.
H04N 1/387 (2006.01)
(52) U.S. Cl. ...................................... 370/465
(58) Field of Classification Search ................. 370/465
See application file for complete search history.

(56) References Cited

U.S. PATENT DOCUMENTS

| 6,288,799 | B1 | 9/2001 | Sekiguchi |
| 2002/0131078 | A1 | 9/2002 | Tsukinokizawa |
| 2006/0132855 | A1* | 6/2006 | Dokuni et al. ............. 358/448 |

FOREIGN PATENT DOCUMENTS

| JP | H09-163064 A | 6/1997 |
| JP | 2001156954 A | 6/2001 |
| JP | 2001251457 A | 9/2001 |
| JP | 2002278529 A | 9/2002 |
| JP | 2002319947 | 10/2002 |

(Continued)

OTHER PUBLICATIONS

Michiko Nagai, DLNA which ensures interconnectivity of PCs and household electrical appliances—compatible products are being launched by various manufacturers (online), Oct. 6, 2004, CNET Japan editorial office <URL: ttp://japan.cnet.com/news/tech/story/0,2000047674,20074987,00.htm>.

(Continued)

*Primary Examiner*—Melvin Marcelo
(74) *Attorney, Agent, or Firm*—Baker Botts L.L.P.

(57) ABSTRACT

There is provided a network system, comprising: a communication device communicating with an external device via a first network, an output device, and a first storage device stored with first data. The communication device, the output device and the first storage device communicate with each other via a second network. The communication device includes a first communication unit to communicate with the external device, a conversion unit which converts the first data into second data to be processed by the output device, a second communication unit which communicates with the output device, a second storage unit stored with information indicating correspondence between the first data and the second data, a first control unit to transmit the first data to the external device according to a transmission instruction, and a second control unit to transmit the second data. The output device includes a third communication unit which communicates with the communication device, a selection unit to select data to be outputted, an output unit which outputs the selected data, an instruction unit which issues the transmission instruction, and a third control unit to transmit the transmission instruction to the communication device.

5 Claims, 10 Drawing Sheets

FOREIGN PATENT DOCUMENTS

| | | | |
|---|---|---|---|
| JP | 2005204212 | A | 7/2005 |
| JP | 2005303392 | A | 10/2005 |
| JP | 2005318035 | A | 11/2005 |
| JP | 2005332154 | A | 12/2005 |

OTHER PUBLICATIONS

Notification of Reasons for Rejection received in corresponding Japanese Patent Application No. 2005-374352, on Jan. 8, 2008.

* cited by examiner

| THUMBNAIL IMAGE | FACSIMILE IMAGE FILE (JPEG FORMAT) |
|---|---|
| FACSIMILE IMAGE FILE 1 | FACSIMILE IMAGE FILE F2(1) |
| FACSIMILE IMAGE FILE 2 | FACSIMILE IMAGE FILE F2(4) |
| FACSIMILE IMAGE FILE 5 | FACSIMILE IMAGE FILE F2(5) |
| ⋮ | ⋮ |

FIG.12

| THUMBNAIL IMAGE | FACSIMILE IMAGE FILE (MH/MR FORMAT) | FACSIMILE IMAGE FILE (JPEG FORMAT) |
|---|---|---|
| FACSIMILE IMAGE FILE 1 | FACSIMILE IMAGE FILE F2(1) | FACSIMILE IMAGE FILE F2(2) |
| FACSIMILE IMAGE FILE 2 | FACSIMILE IMAGE FILE F2(3) | FACSIMILE IMAGE FILE F2(4) |
| FACSIMILE IMAGE FILE 4 | FACSIMILE IMAGE FILE F2(7) | FACSIMILE IMAGE FILE F2(8) |
| ⋮ | ⋮ | ⋮ |

FIG.13

NETWORK SYSTEM, COMMUNICATION DEVICE AND PROGRAM

CROSS-REFERENCE TO RELATED APPLICATION

This application claims priority under 35 U.S.C. §119 from Japanese Patent Application No. 2005-374352, filed on Dec. 27, 2005. The entire subject matter of the application is incorporated herein by reference.

BACKGROUND

1. Technical Field

Aspects of the present invention relates to a network system for sharing data (content, etc.) stored in a server, and a communication device for transmitting and receiving such data to be shared in the network system.

2. Related Art

Network systems, capable of connecting and integrating a variety of electrical appliances via a LAN (Local Area Network), have come into wide use in ordinary households in recent years (see Japanese Patent Provisional Publication No. 2002-319947, for example).

Under such circumstances, a standard called DLNA (Digital Living Network Alliance®) has been proposed so that still image data, video data and music data (audio data) can be shared among PCs (Personal Computers), TV program recording devices, mobile devices, etc. by connecting the devices together by a LAN.

In a network system employing the standard, content (video, etc.) stored in a PC in a house can be operated and appreciated (edited, viewed, etc.) on other electrical appliances (television set, etc.) in the house via a LAN (see Michiko Nagai, "DLNA which ensures interconnectivity of PCs and household electrical appliances—compatible products are being launched by various manufacturers" (online), Oct. 6, 2004, CNET Japan editorial office <URL: http://japan.cnet.com/news/tech/story/0,2000047674,20074987,00.htm> (browsed on Sep. 16, 2005), for example). In short, DLNA® is a technique for sharing content, etc. stored in a server.

However, in such a network system connecting a plurality of network-compatible devices together by a network and thereby sharing various data, it is impossible to share data which is sent from the outside of the network in a data format that can not be processed by some of the network-compatible devices.

SUMMARY

Aspects of the present invention are advantageous in that a technique for a network system including a communication device (connected to a first network), an output device and a storage device (for storing data) which are connected together by a second network, capable of allowing the output device (connected to the second network) to use data communicated on the first network and realizing transmission of data shared in the second network to the outside of the second network, can be provided.

BRIEF DESCRIPTION OF THE ACCOMPANYING DRAWINGS

FIG. 12 is a table showing correspondence between thumbnail images and facsimile image files F2 in the JPEG format.

FIG. 13 is a table showing correspondence among thumbnail images, facsimile image files F2 in the JPEG format, and facsimile image files F2 in the MH/MR format.

DETAILED DESCRIPTION

General Overview

Figure 1:
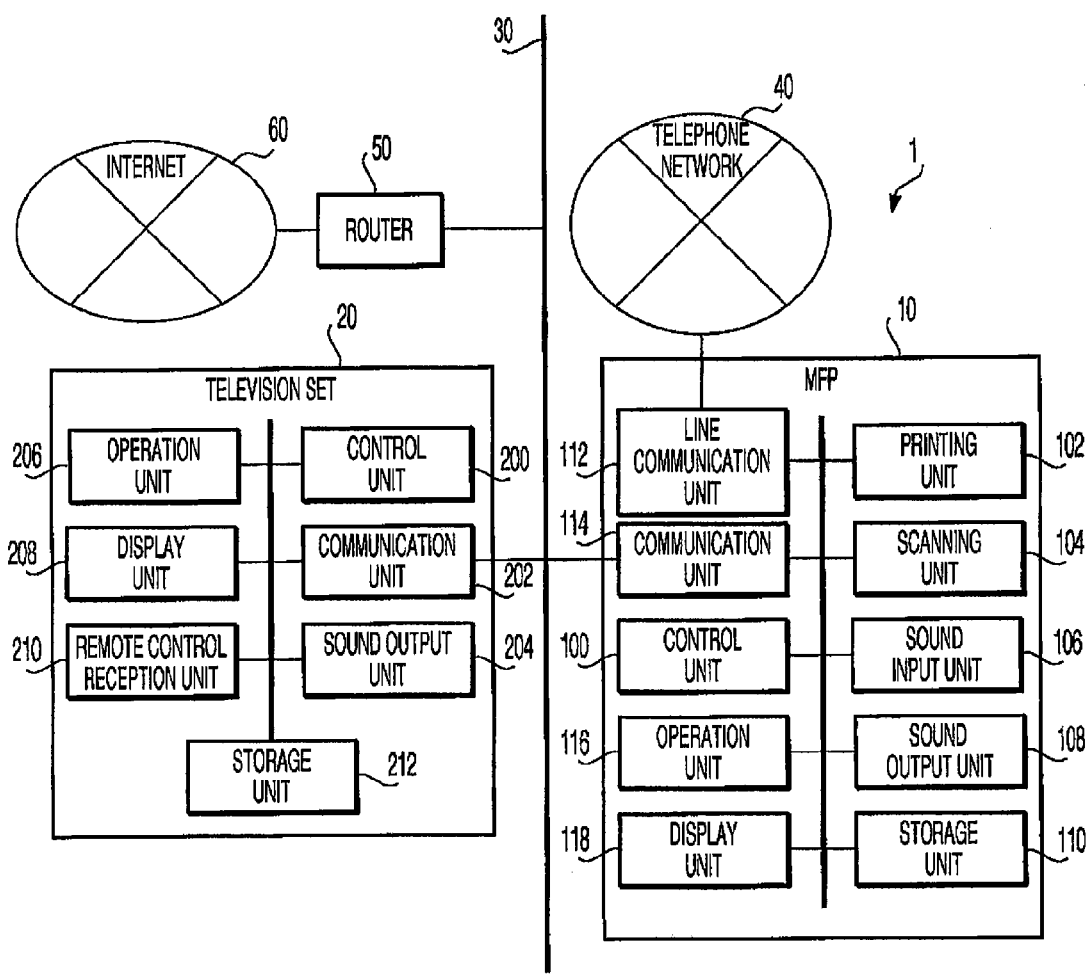
FIG. 1 is a block diagram showing the composition of a network system in accordance with a first embodiment of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

In accordance with an aspect of the present invention, there is provided a network system comprising: a communication device configured to communicate with an external device via a first network, an output device, and a first storage device stored with first data, the first storage device being capable of being accessed by the communication device and the output device. The communication device, the output device and the first storage device communicate with each other via a second network. The communication device includes a first communication unit which communicates with the external device via the first network, a conversion unit which converts the first data into second data, the second data being in a predetermined format, the output device being configured to process the second data, a second communication unit which communicates with the output device via the second network, a second storage unit stored with information indicating correspondence between the first data and the second data, and a first control unit which allows the first communication unit to transmit the first data to the external device via the first network according to a transmission instruction issued by the output device, and a second control unit which allows the second communication unit to transmit the second data to the output device. The output device includes a third communication unit which communicates with the communication device via the second network, a selection unit which allows a user to select data to be outputted, an output unit which outputs the data selected by the selection unit, an instruction unit which issues the transmission instruction when the second data is selected, and a third control unit which allows the third communication unit to transmit the transmission instruction to the communication device.

In the network system configured as above, data to be handled (communicated or processed) in the first network is converted by the conversion unit of the communication device into data to be handled in the second network, and information indicating the correspondence between the first data and the second data is stored in the second storage unit so that the execution of a function of the first network can be ordered from the second network. When the execution of a function of the first network is ordered from the second network, a piece of first data as the object of the function of the first network is identified based on the correspondence information stored in the second storage unit. In other words, data conversion from a data format that can be used in the first network into a data format that can be used in the second network is realized by the conversion unit, and when a piece of second data is selected in the second network, a piece of first data can be transmitted by the communication device to the first network according to the correspondence stored in the second storage unit. With this configuration, data received by the communication device from the first network can be processed in the second network, and data used in the second network can be transmitted to the first network.

Therefore, the user of the network system is allowed to browse data at the output device without the need of worrying about the format of the data received by the communication device from the first network. Further, the first data to be actually transmitted to the first network can be stored in the storage device while letting the output device just store the second data for allowing the user to make a selection of data, by which memory consumption of the output device (without the need of storing both the first data and the second data) can be saved. Furthermore, the user can order the data transmission at any place where there is an output device on the second network, without the trouble of getting over to the installation site of the communication device and issuing a transmission instruction.

Incidentally, the "second data" in the above configuration is only required to be able to specify the first data and to be outputted by the output device. Therefore, the second data can be a thumbnailed image of the first data, an image obtained by converting and/or reducing the first data, or an image made up of or including textual information. The "data" in the above configuration include the first data and the second data.

In at least one aspect, the first storage device is stored with the first data, the first data being used by devices connected to the second network. In this configuration, when the second data corresponding to the first data is selected, the conversion unit converts the first data into data that can be transmitted by the first communication unit, and the first communication unit transmits the converted data to the external device via the first network.

In the network system configured as above, any data to be used in the second network can be converted (data conversion) by the conversion unit into data that can be used in the first network, and the converted data can be transmitted to the first network according to an operation on the second data. Therefore, in the network system, even data other than those received via the first network can be transmitted to a communication device outside the second network, and the user can issue the transmission instruction via the first communication unit without the need of worrying about the format of the data to be transmitted.

Incidentally, the "devices connected to the second network" in the above configuration can include the communication device, the output device and other devices connected to the second network.

In accordance with another aspect of the present invention, there is provided a communication device capable of communicating with an external device via a first network while being connected to a second network to which an output device and a first storage device are connected, the first storage device being stored with first data and being capable of being accessed by the communication device and the output device. The communication device comprises: a first communication unit which communicates with the external device via the first network, a conversion unit which converts the first data into second data, the second data being in a predetermined format, the output device being configured to process the second data, a second communication unit which communicates with the output device via the second network, a second storage unit stored with information indicating correspondence between the first data and the second data, a first control unit which allows the first communication unit to transmit the first data to the external device via the first network according to a transmission instruction issued by the output device, and a second control unit which allows the second communication unit to transmit the second data to the output device.

In accordance with another aspect of the present invention, there is provided a computer readable medium having computer readable instructions stored thereon, which, when executed by a computer capable of communicating with an external device via a first network while being connected to a second network to which an output device and a first storage device stored with first data being capable of being accessed by the computer and the output device are also connected, are configured to communicate with the external device via the first network, to convert the first data into second data, the second data being in a predetermined format, the output device being configured to process the second data, to communicate with the output device via the second network, to store information indicating correspondence between the first data and the second data, to transmit the first data to the external device via the first network according to a transmission instruction issued by the output device, and to transmit the second data to the output device.

With the communication device and the computer program product configured as above, the network system described above can be implemented and effects similar to those of the network system can be achieved.

The above computer program product can be stored in a computer-readable record medium (flexible disk, magneto-optic disk, CD-ROM, DVD-ROM, hard disk, ROM, RAM, etc.) and used by loading it into a computer and activating it as needed. The computer program product can also be used by loading it into a computer via a network.

EMBODIMENT

Referring now to the drawings, a description will be given in detail of preferred embodiments in accordance with the present invention.

First Embodiment

FIG. 1 is a block diagram showing the composition of a network system 1 in accordance with a first embodiment of the present invention.

In the network system 1, an MFP (Multi Function Peripheral) 10 functioning as a facsimile machine and a television set 20 displaying images are connected with each other via a LAN (Local Area Network) 30 to be capable of data communication as shown in FIG. 1.

The MFP 10 comprises a control unit 100 including a CPU (Central Processing Unit), a ROM (Read Only Memory), a RAM (Random Access Memory), etc. and controlling the operation of the whole MFP 10, a printing unit 102 for forming (printing) images on print media such as paper, a scanning unit 104 for scanning images, a sound input unit 106 including a microphone, a sound output unit 108 including a speaker, a storage unit 110 including a rewritable storage medium (memory card, hard disk, etc.), a line communication unit 112 for executing data communication with other communication devices via a telephone network 40 as a public network, a communication unit 114 for executing data communication with the television set 20 via the LAN 30, an operation unit 116 having a plurality of operation keys to be operated by the user, and a display unit 118 for displaying a variety of information.

The MFP 10 is capable of operating as a facsimile machine by use of the printing unit 102, the scanning unit 104, the line communication unit 112, etc. The facsimile transmission/reception function by use of the printing unit 102, the scanning unit 104, the line communication unit 112, etc. will hereinafter be referred to simply as a "facsimile function". In the RAM of the control unit 100, a buffer for temporarily storing facsimile data received by the line communication unit 112 is formed.

Figure 2:
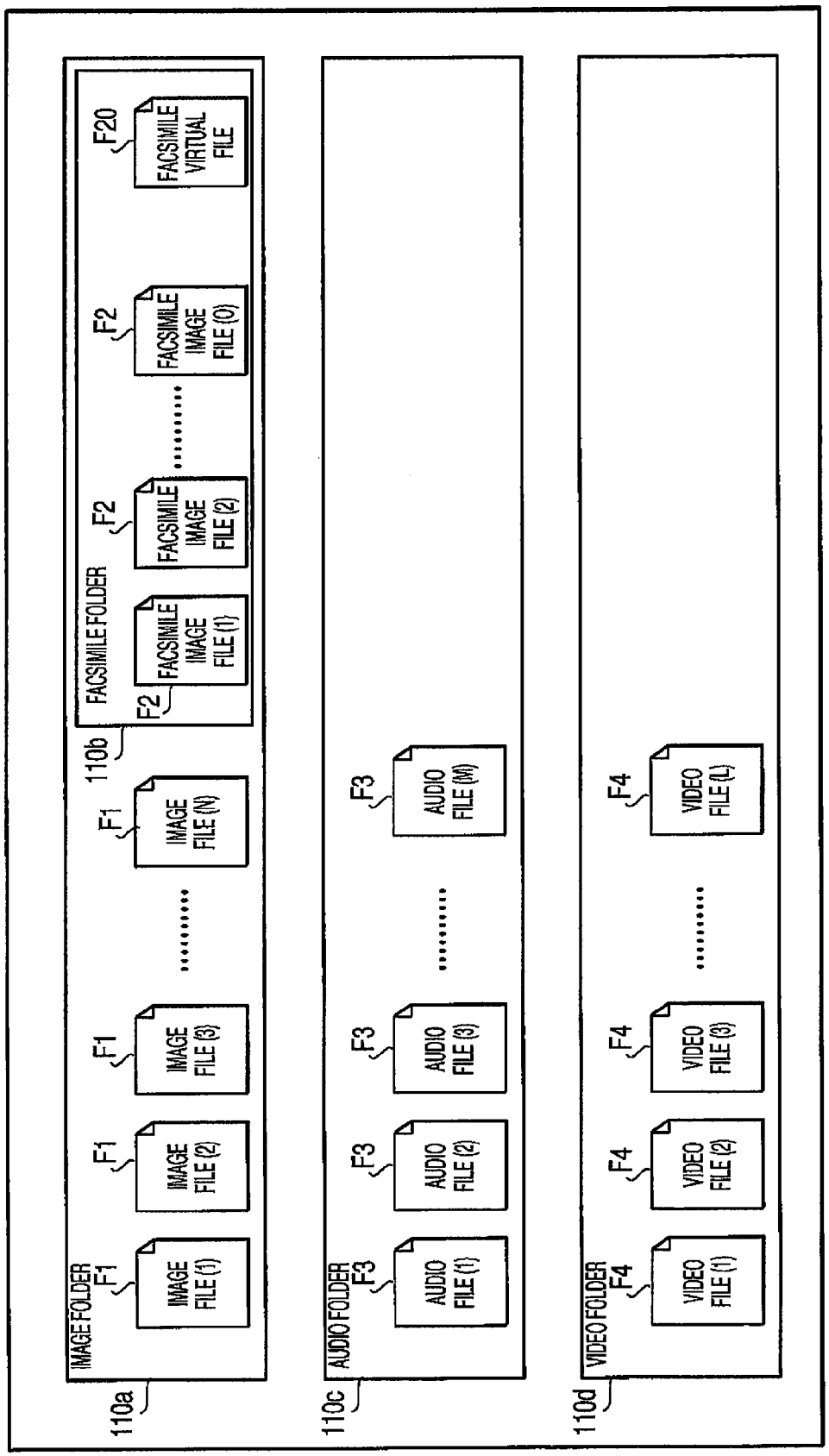
FIG. 2 is a schematic diagram showing the folder configuration of a storage unit of an MFP (Multi Function Peripheral) included in the network system of the first embodiment (and the folder configuration of a storage unit of a television set included in a network system of a third embodiment).

As shown in FIG. 2, in a storage area of the storage unit 110, an image folder 110a for storing files of still image data (hereinafter referred to as "image files"), an audio folder 110c for storing files of audio data (hereinafter referred to as "audio files"), and a video folder 110d for storing files of video data (hereinafter referred to as "video files") are formed.

In the image folder 110a storing image files F1, a facsimile folder 110b is formed. The facsimile folder 110b stores facsimile image files F2 indicating the contents of facsimile communication. The facsimile image files F2 include transmission facsimile data files and files (in a data format that can be used by devices connected to the LAN 30) which have been converted from received facsimile data. In the facsimile folder 110b storing the facsimile image files F2, a facsimile virtual file F20 to be used for displaying a facsimile icon I1 (selected by the user for issuing an instruction for starting the operation of the facsimile function, explained later) on a display unit 208 of the television set 20 is also stored. The audio files F3 and the video files F4 are stored in the audio folder 110c and the video folder 110d, respectively.

Meanwhile, the television set 20 comprises a control unit 200 for controlling the operation of the whole television set 20, a communication unit 202 for executing data communication with the MFP 10 via the LAN 30, a sound output unit 204 including speakers, an operation unit 206 including an unshown remote control, mouse, keyboard, etc., the display unit 208 for displaying images, a remote control reception unit 210 for receiving signals from the remote control, and a storage unit 212 for storing data received from the MFP 10.

The display unit 208 is capable of displaying a file selection screen, for letting the user issue an instruction for selecting a file from the files stored in the storage units 212 and 110 or an instruction for starting the operation of the facsimile function, according to a user operation through the operation unit 206.

Figure 3:
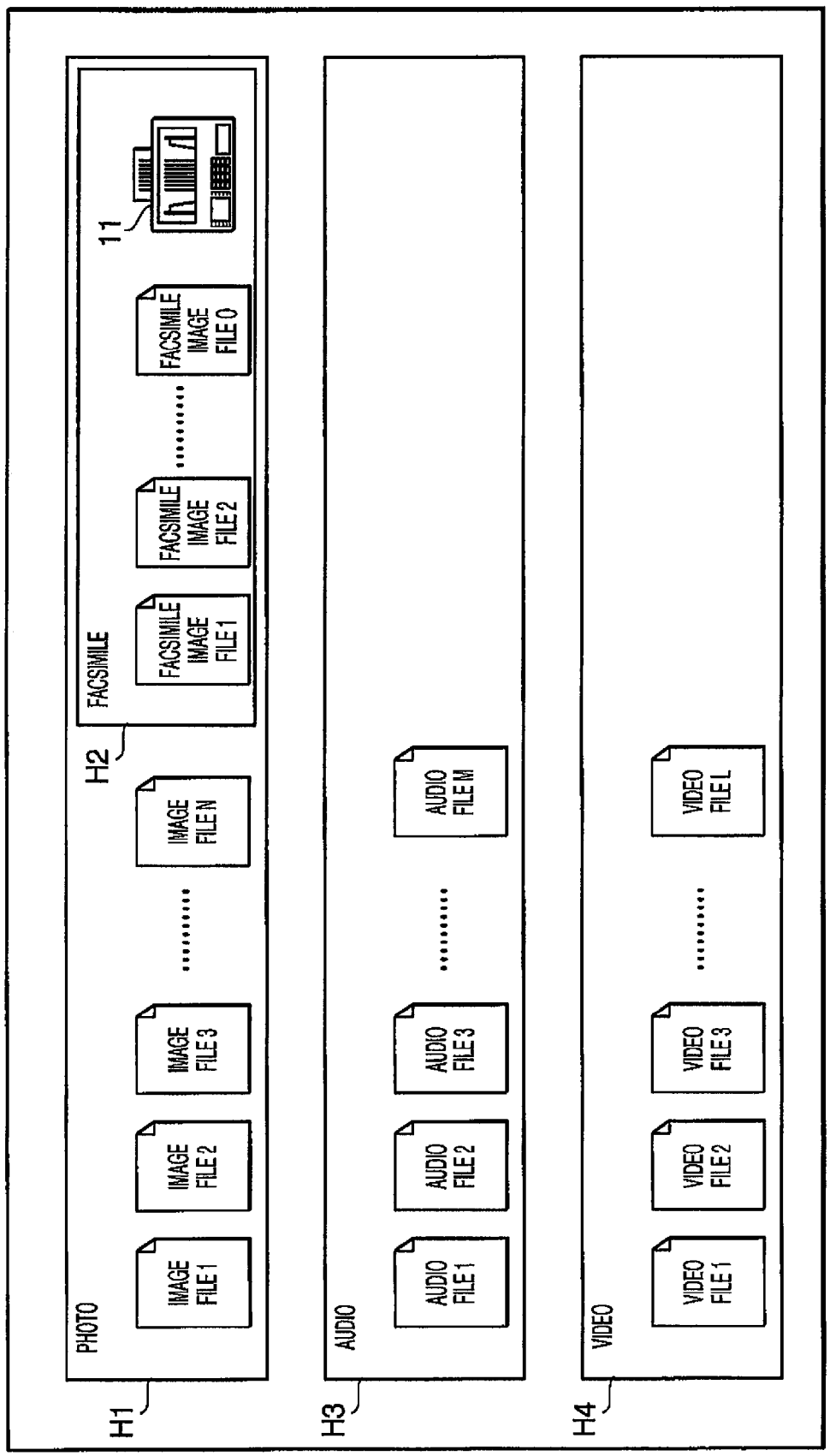
FIG. 3 is a schematic diagram showing a file selection screen which is displayed on a display unit of the television set.

As shown in FIG. 3, the file selection screen is segmented into a photo display area H1 for displaying the image files F1 stored in the image folder 110a as image files, a facsimile display area H2 for displaying the facsimile image files F2 stored in the facsimile folder 110b as facsimile image files, an audio display area H3 for displaying the audio files F3 stored in the audio folder 110c as audio files, and a video display area H4 for displaying the video files F4 stored in the video folder 110d as video files.

Incidentally, each file displayed in each display area is a thumbnail image (WAGE FILE 1, FACSIMILE IMAGE FILE 1, AUDIO FILE 1, VIDEO FILE 1, etc. in FIG. 3) of a file stored in each folder (image folder 110a, facsimile folder 110b, audio folder 110c, video folder 110d). By selecting such a thumbnail by operating the operation unit 206, a transmission request for the transmission of a file stored in the storage unit 110 while being associated with the thumbnail can be issued to the MFP 10, or the file corresponding to the thumbnail can be displayed on the display unit 208 (and/or outputted via the sound output unit 204).

In the facsimile display area H2, the aforementioned facsimile icon I1 (to be selected by the user for issuing the instruction for starting the operation of the facsimile function) is also displayed.

When the user drags and drops a thumbnail of a file (that the user hopes to transmit by use of the facsimile function) onto the facsimile icon I1 by operating the operation unit 206 (including the unshown remote control), a facsimile transmission instruction is transmitted from the television set 20 to the MFP 10 and a facsimile transmission process is executed by the control unit 100 of the MFP 10. The facsimile transmission instruction transmitted to the MFP 10 contains the file (which has been stored in the storage unit 110) corresponding to the thumbnail dragged and dropped by the user.

In the first embodiment, the MFP 10 and the television set 20 connected to the LAN 30 are network-compatible devices, that is, devices capable of data communication with other network-compatible devices via the LAN 30.

While facsimile data is taken as an example of a data format that can not be used (processed) by network-compatible devices other than the MFP 10 (among various types of data communicated between the MFP 10 and a communication device connected to a network outside the LAN 30) in the first embodiment, such data formats that can not be used by other network-compatible devices can include data formats other than the facsimile data.

The devices connected to the LAN 30 (MFP 10, television set 20, etc.) are capable of detecting and controlling one another by use of multicast packets in conformity with the technical specifications of UPnP (Universal Plug and Play®), for example. Thus, changes in the status of each device (e.g. update or deletion of a file stored in a device, addition of a new function to a device, etc.) are successively reported to each device on the LAN, by which the latest configuration of the storage unit 110 of the MFP 10 can be constantly displayed on the display unit 208 of the television set 20.

Figure 4:
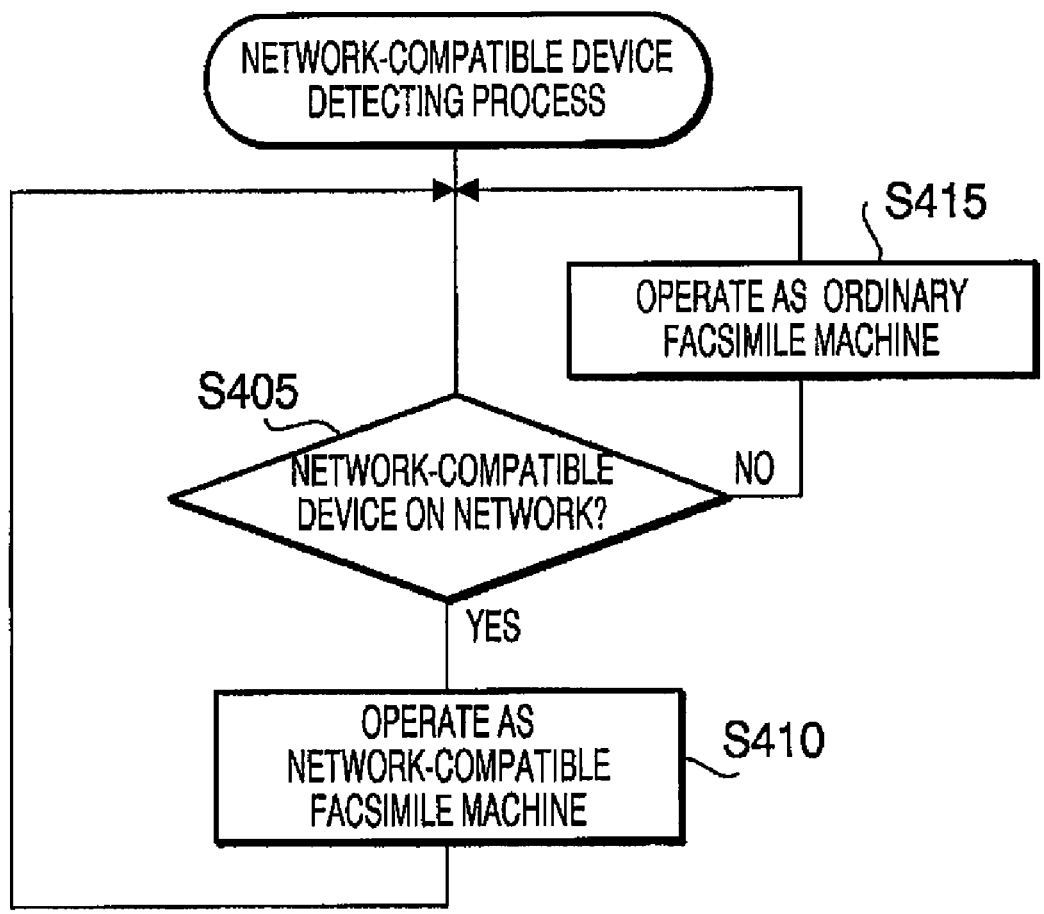
FIG. 4 is a flow chart showing a network-compatible device detecting process executed by a control unit of the MFP 10 in the first embodiment.

Next, a facsimile transmission/reception process executed by the control unit 100 of the MFP 10 will be described in detail. FIG. 4 is a flow chart showing a process (network-compatible device detecting process) executed by the control unit 100 mainly for checking whether or not there exists a network-compatible device (other than the MFP 10) which has been connected to the LAN 30. First, the control unit 100 checks whether or not there exists a network-compatible device connected to the LAN 30 (S405). The check can be conducted by transmitting a multicast packet in conformity with UPnP®, for example.

When a response from a network-compatible device other than the MFP 10 is received, the control unit 100 judges that there exists a network-compatible device on the LAN 30 (S405: YES) and thereafter the MFP 10 operates as an MFP having a network-compatible facsimile function (S410). The MFP 10 keeps on functioning as a network-compatible facsimile machine as long as a network-compatible device is recognized on the LAN 30. On the other hand, when no response from a network-compatible device other than the MFP 10 is received, the control unit 100 judges that there exists no network-compatible device on the LAN 30 (S405: NO) and thereafter the MFP) 10 operates as an MFP having the ordinary facsimile function except that the control unit 100 constantly makes the check on the existence of a network-compatible device connected to the LAN 30 (S415).

As above, when there exists no network-compatible device (other than the MFP 10) on the LAN 30, the MFP 10 executes the ordinary facsimile function. In this case, the storage unit 110 (generally storing various data used by the network-compatible facsimile machine) can be used as a storage area exclusively for the facsimile transmission/reception, by which storage of a larger amount of facsimile data becomes possible. Further, since the ordinary facsimile machine is functionally simpler than the network-compatible facsimile machine (with no need of extra functions or operations), memory resources necessary for the operation of the MFP 10 can be conserved in larger amounts.

The above network-compatible device detecting process is repeatedly executed until the control unit 100 stops its operation, that is, until the power of the MFP 10 is turned OFF.

Incidentally, the "network-compatible facsimile machine" in the first embodiment means a facsimile machine capable of converting received facsimile data and/or transmission facsimile data into data in a data format that can be used by network-compatible devices connected to the LAN 30 (data format that can be processed in a second network (the LAN 30 in this embodiment)) and communicating the converted facsimile data with the network-compatible devices. Specifically, an MFP (MFP 10), storing not only facsimile data but also image data, audio data, video data, etc. and functioning as a server, is taken as an example of the network-compatible facsimile machine in the first embodiment.

Figure 5:
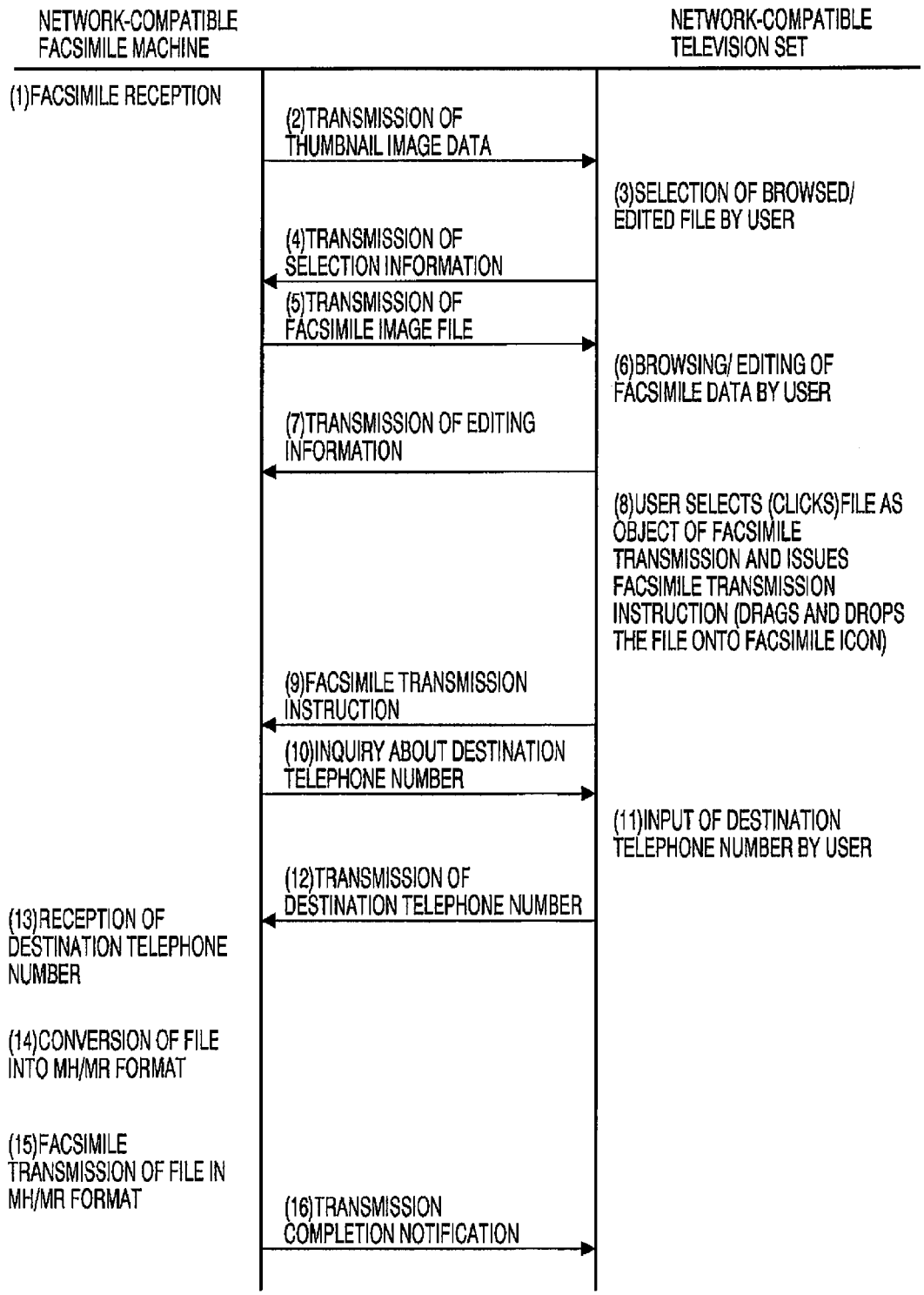
FIG. 5 is a timing chart showing an example of the operation of the network system of the first embodiment.

In the following, the operation of the MFP 10 functioning as a network-compatible facsimile machine will be described in detail. FIG. 5 is a timing chart showing procedures for the communication of various data between the MFP 10 and the television set 20, processes executed by the MFP 10 and the television set 20 for the facsimile communication, operations performed by the user, etc. along a time sequence. The timing chart (FIG. 5) in the first embodiment shows a case where both the transmission facsimile files and the received facsimile files are stored in the MFP 10.

Figure 6:
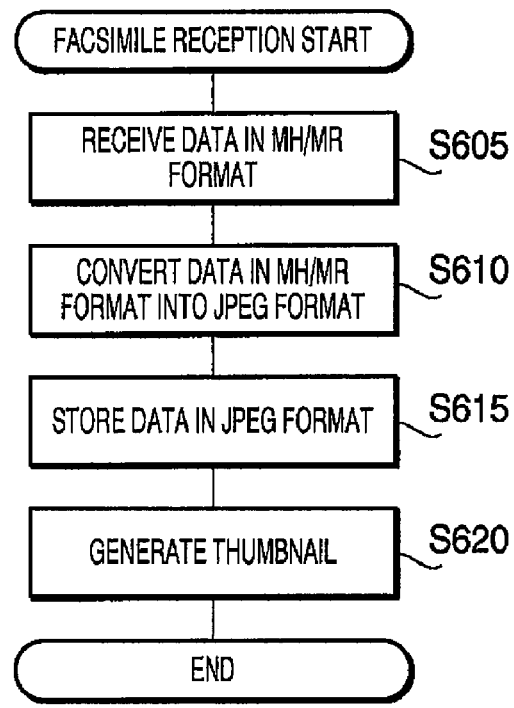
FIG. 6 is a flow chart showing a facsimile reception process executed by the MFP in the first embodiment.

First, upon reception of facsimile data transmitted via the telephone network 40 (see (1) in FIG. 5), the MFP 10 executes a facsimile reception process as shown in a flow chart of FIG. 6.

In the facsimile reception process of FIG. 6, the MFP 10 receives facsimile data in the MH (Modified Huffman)/MR (Modified Relative element address) format (general compression format for facsimile data) (S605), and temporarily stores the received facsimile data in the MH/MR format in a buffer in the RAM of the control unit 100.

Subsequently, in order to display the received facsimile data on the display unit 208 of the television set 20 connected to the LAN 30, the control unit 100 converts the facsimile data in the MH/MR format stored in the buffer into image data in the JPEG format, for example (S610) and stores the converted facsimile data (JPEG image data) in the facsimile folder 110b as a facsimile image file F2 (S615). Further, the control unit 100 generates thumbnail image data in the JPEG format, to be displayed on the file selection screen to specify the converted image data, based on the converted image data (S620). The correspondence between the (converted) image data in the JPEG format and the thumbnail image data (thumbnail image) specifying the image data is recorded and stored in the storage unit 110 as shown in FIG. 12. The correspondence stored in the storage unit 110 will be used for specifying a corresponding facsimile image file F2 (JPEG image data) stored in the facsimile folder 110b when a file selection is made by the user on the file selection screen by selecting a thumbnail, as will be explained later.

Incidentally, the image data (in the JPEG format in this embodiment) generated by the data conversion is only required to be in a certain data format that can be displayed by the display unit 208 of the television set 20, and thus the image data can also be in the GIF format, TIFF format, etc. as long as the data can be used (processed) by the network-compatible devices on the LAN 30.

While the thumbnail image data is generated based on the converted image data (JPEG image data) in the above explanation, the thumbnail image data may also be generated directly from the received facsimile data in the MH/MR format stored in the buffer in the RAM of the control unit 100. In this case, the time necessary for the generation of the thumbnail can be shortened since the image data and the thumbnail in the JPEG format can be generated simultaneously from the facsimile data in the MH/MR format (instead of generating the JPEG image data from the MH/MR data and thereafter generating the thumbnail based on the JPEG image data). Further, the MFP 10 may also be configured to inquire of each device connected to the LAN 30 about a usable (processable) data format by transmitting a multicast packet in conformity with UPnP®, etc. and determine the data format of the converted image data based on the response from each device. With this configuration, the format of the (converted) image data generated by the MFP 10 is prevented from being incompatible with each device on the LAN 30.

After the conversion from the MH/MR data to the JPEG image data is finished, the MH/MR data stored in the buffer is deleted. Subsequently, the thumbnail image data is transmitted to the television set 20 (see (2) in FIG. 5). The television set 20 stores the received thumbnail image data in the storage unit 212, by which a thumbnail image according to the thumbnail image data is displayed in the facsimile display area H2 of the file selection screen displayed on the display unit 208 of the television set 20. Incidentally, the thumbnail image data can either be image data generated by directly reducing the size of the received facsimile data (or the converted image data) or image data of an icon designed specifically for facsimile images, as long as each file stored in the storage unit 110 can be correctly recognized by the user.

When a thumbnail is selected by the user from the facsimile display area H2 by operating the operation unit 206 (see (3) in FIG. 5), selection information representing the selected thumbnail is transmitted from the television set 20 to the MFP 10 (see (4) in FIG. 5), a facsimile image file F2 specified by the selected thumbnail (represented by the selection information) is read out from the facsimile folder 110*b*, and the facsimile image file F2 is transmitted from the MFP 10 to the television set 20 (see (5) in FIG. 5), by which the facsimile data (JPEG image data) contained in the facsimile image file F2 is displayed on the display unit 208 of the television set 20 to be browsed by the user. The user is also allowed to edit the displayed facsimile data by adding characters, illustrations, etc. to the facsimile data by operating the operation unit 206 (see (6) in FIG. 5). Data representing the contents of the editing are successively transmitted from the television set 20 to the MFP 10 as editing information (see (7) in FIG. 5), and the edited facsimile data is stored in the facsimile folder 110*b* as an updated facsimile image file F2 when the storage (saving) of the edited facsimile data is instructed by the user. At the same time, the thumbnail image data is generated for the updated facsimile image file F2. The thumbnail image of the updated facsimile image file F2 can be displayed in the facsimile display area H2 of the file selection screen on the display unit 208 of the television set 20 by the multicast in conformity with UPnP®

Incidentally, the files that the user can browse and edit are not restricted to the facsimile image files F2; the user can similarly browse and edit other types of files displayed on the file selection screen.

Subsequently, when the user of the network system 1 selects a thumbnail of a file (as an object of facsimile transmission) from the file selection screen by operating the operation unit 206 of the television set 20 (e.g. by clicking on the thumbnail) and drags and drops the selected thumbnail onto the facsimile transmission icon 11 in the facsimile display area H2 (see (8) in FIG. 5), the user operation is reported to the MFP 10 as a facsimile transmission instruction regarding the facsimile image file F2 (stored in the facsimile folder 110*b*) specified by the selected thumbnail (see (9) in FIG. 5).

Upon reception of the facsimile transmission instruction, the MFP 10 transmits a facsimile destination request (inquiring about the destination of the facsimile transmission of the selected file) to the television set 20 (see (10) in FIG. 5), by which a display for prompting the user to input the telephone number of the destination is made on the display unit 208. When the destination telephone number is inputted by the user through the operation unit 206 of the television set 20 (see (11) in FIG. 5), data representing the destination telephone number is transmitted to the MFP 10 (see (12) and (13) in FIG. 5).

Subsequently, the MFP 10 converts the selected facsimile image file F2 from the JPEG format into the MH/MR format for the facsimile transmission (see (14) in FIG. 5) and executes the facsimile transmission by originating a call to the destination telephone number (see (15) in FIG. 5). After the facsimile transmission is completed, the MFP 10 transmits a notification (indicating the completion of facsimile transmission) to the television set 20 (see (16) in FIG. 5). The television set 20 receiving the notification informs the user of the completion of facsimile transmission by displaying a message, etc. on the display unit 208.

When the facsimile transmission is not completed normally or when a file inappropriate for facsimile transmission (audio file, video file, etc.) is selected by the user for the facsimile transmission, the MFP 10 transmits a transmission error notification to the television set 20 together with information on the cause of the error, by which the user is informed of not only the occurrence of a transmission error but also the cause of the error, which is helpful to the user for retransmission of facsimile data.

As described above, in the network system 1 in accordance with the first embodiment of the present invention, each piece of facsimile data received by the MFP 10 (facsimile machine) from the telephone network 40 (each facsimile image file F2) can be displayed on the display unit 208 of the television set 20 by the steps (1)-(6) shown in FIG. 5, by which the user is allowed to browse the received facsimile documents on the high-resolution screen (display unit 208) of the television set 20, without the need of browsing the documents on the small-sized display screen (display unit 118) of the MFP 10. Thus, small characters, etc. that are hard to view on the small-sized display screen of the MFP 10 can easily be read by the user. Further, the browsing of the facsimile documents is possible only by operating the operation unit (including the unshown remote control, mouse, keyboard, etc.) of a television set (at any place where the television set is installed) without the need of getting over to the facsimile machine (MFP 10), which is very convenient for the user.

Further, the data stored in the facsimile folder 110*b* of the storage unit 110 in this embodiment are restricted to data in the JPEG format, by which the storage capacity of the storage unit 110 can be conserved efficiently.

Since the editing and processing of the facsimile image file F2 (JPEG image data converted from the received facsimile data in the MH/MR format) displayed on the display unit 208 of the television set 20 is possible, the user can transfer the received facsimile data to another device by adding a brief description to the received facsimile data (JPEG image data displayed on the display unit 208). The transfer (facsimile transmission) of the received facsimile data is possible without the trouble of once outputting (printing) the received facsimile data on paper before the editing/addition, by which the workload on the user can be reduced considerably.

Furthermore, since the data transmitted from the MFP 10 to the television set 20 in the step (2) shown in FIG. 5 is the thumbnail image data of a small data size which is used only for forming the file selection screen and specifying a file stored in the storage unit 110, a large number of thumbnails (or more various thumbnails) can be stored in the television set 20 and a larger number of files selectable by the user can be presented on the display unit 208 (compared to a case where large-sized JPEG data converted from received facsimile data in the MH/MR format are stored in the television set 20 and directly displayed on the file selection screen) even when the storage capacity of the television set 20 is small. The television set 20 is only required to mainly handle files (thumbnail image data) of small data sizes, by which the processing load on the television set 20 can be reduced and the data traffic on the network between the MFP 10 and the television set 20 can also be reduced.

Incidentally, while the file as the object of facsimile transmission is determined according to a display made on the display unit 208 of the television set 20 in the first embodiment, it is of course possible to execute the facsimile transmission according to a display made on the display unit 118 of the MFP 10. Also in such cases, after the file to be transmitted is determined by the user (by operating the operation unit 116 of the MFP 10), the facsimile transmission is carried out after converting the transmission file from the JPEG format into the MH/MR format.

Second Embodiment

In the above first embodiment, the facsimile data in the MH/MR format received by the MFP 10 in the step S605 of FIG. 6 is temporarily stored in the buffer in the RAM of the control unit 100, and the facsimile data in the MH/MR format is deleted after the conversion into the JPEG format is finished. In a second embodiment which will be described below, the received facsimile data in the MH/MR format is stored and retained in the facsimile folder 110b of the storage unit 110 as a facsimile image file F2 (in the MH/MR format) together with the JPEG image data obtained by the data conversion, as in a facsimile reception process shown in FIG. 7.

In the following, the operation of the MFP 10 in the second embodiment functioning as a network-compatible facsimile machine will be described in detail, focusing on the difference from the first embodiment.

Figure 7:
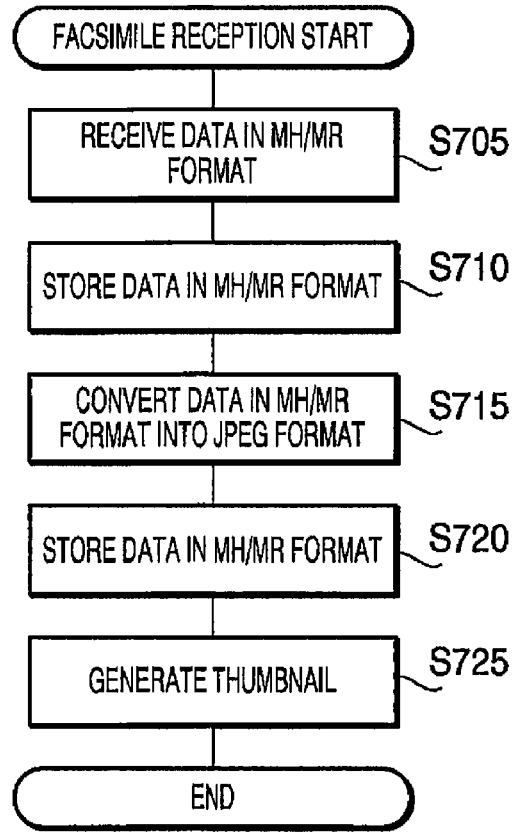
FIG. 7 is a flow chart showing a facsimile reception process executed by an MFP included in a network system in accordance with a second embodiment of the present invention.

First, upon reception of facsimile data transmitted via the telephone network 40 (see (1) in FIG. 5), the MFP 10 executes the facsimile reception process shown in the flow chart of FIG. 7.

In the facsimile reception process of FIG. 7, the MFP 10 receives facsimile data in the MH/MR format (general compression format for facsimile data) (S705) and stores the received facsimile data in the facsimile folder 110b of the storage unit 110 as a facsimile image file F2 (S710).

Subsequently, in order to display the received facsimile data on the display unit 208 of the television set 20, the control unit 100 converts the facsimile image file F2 (received facsimile data in the MH/MR format) stored in the facsimile folder 110b into image data in the JPEG format (S715) and stores the converted image data (JPEG image data) in the facsimile folder 110b as a facsimile image file F2 separately from the aforementioned facsimile image file F2 (received facsimile data in the MH/MR format) (S720). Further, the control unit 100 generates thumbnail image data in the JPEG format, to be displayed on the file selection screen to specify the converted image data in the JPEG format or the received facsimile data in the MH/MR format (before the conversion), based on the converted image data (S725). The correspondence among the (converted) image data in the JPEG format, the received facsimile data in the MH/MR format and the thumbnail image data (thumbnail image) specifying those data is recorded and stored in the storage unit 110 as shown in FIG. 13. The correspondence stored in the storage unit 110 will be used for specifying a corresponding facsimile image file F2 (in the MH/MR format or the JPEG format) stored in the facsimile folder 110b when a file selection is made by the user on the file selection screen by selecting a thumbnail.

By the above process, not only the JPEG image data to be displayed on the television set 20 but also the facsimile data in the MH/MR format is stored in the MFP 10. Therefore, when a thumbnail specifying a piece of facsimile data in the MH/MR format as a transmission facsimile data (transmission file) is selected by the user, the step (14) in FIG. 5 can be left out in the facsimile transmission. By the omission of the data conversion from the JPEG format into the MH/MR format, the processing time necessary for the facsimile transmission can be reduced.

Incidentally, when a facsimile image file F2 (in the JPEG format) is edited by the user by operating the operation unit 206 of the television set 20 in the step (6) in FIG. 5, data representing the contents of the editing are successively transmitted to the MFP 10 as editing information (see (7) in FIG. 5), and a corresponding piece of JPEG image data is updated when the storage (saving) of the edited facsimile data (updated JPEG image data) is instructed by the user. At the same time, the thumbnail image data is generated for the updated facsimile image file F2 (updated JPEG image data). The thumbnail image of the updated facsimile image file F2 can be displayed in the facsimile display area H2 of the file selection screen on the display unit 208 of the television set 20 by the multicast in conformity with UPnP®. In this case, the facsimile image file F2 in the JPEG format which has been updated and stored in the facsimile folder 110b is converted into the MH/MR format by executing the step (14) in FIG. 5 to the updated facsimile image file F2 in the JPEG format. As above, for the facsimile transmission of the edited (updated) facsimile image file F2 in the JPEG format, the facsimile data in the MH/MR format is newly generated by the data conversion, by which the facsimile transmission can be executed by use of the edited content of the facsimile data.

Third Embodiment

In the first and second embodiments, various types of data such as facsimile data are stored in the storage unit 110 of the MFP 10. In a third embodiment which will be described below, after the conversion of the received facsimile data in the MH/MR format into image data in the JPEG format, the converted image data (JPEG image data) is transmitted to the television set 20 and stored in the storage unit 212 of the television set 20.

Figure 8:
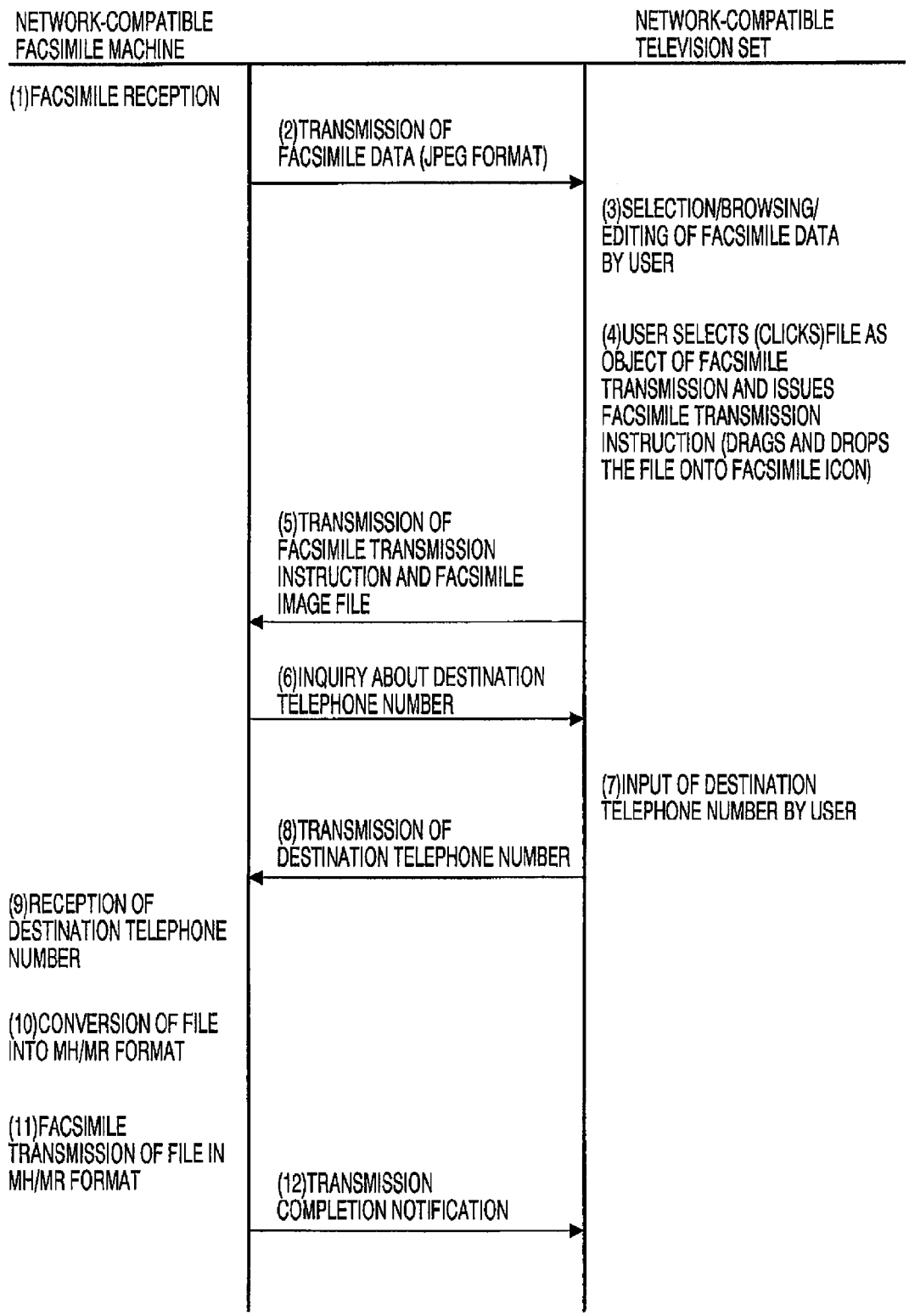
FIG. 8 is a timing chart showing an example of the operation of a network system in accordance with a third embodiment of the present invention.

FIG. 8 is a timing chart showing procedures for the communication of various data between the MFP 10 and the television set 20 in the third embodiment, processes executed by the MFP 10 and the television set 20 for the facsimile communication, operations performed by the user, etc. along a time sequence. The timing chart (FIG. 8) in the third embodiment shows the case where the facsimile data received by the MFP 10 is converted into image data in the JPEG format and the converted data (JPEG image data) is transmitted to the television set 20 and stored in the storage unit 212. In the third embodiment, the storage unit 212 of the television set 20 has a folder configuration similar to the folder configuration of the storage unit 110 of the MFP 10 in the first embodiment which has been explained referring to FIG. 2 (image folder 110a, facsimile folder 110b, audio folder 110c and video folder 110d).

In the following, the operation of the MFP 10 in the third embodiment functioning as a network-compatible facsimile machine will be described in detail, focusing on features specific to the third embodiment.

Figure 9:
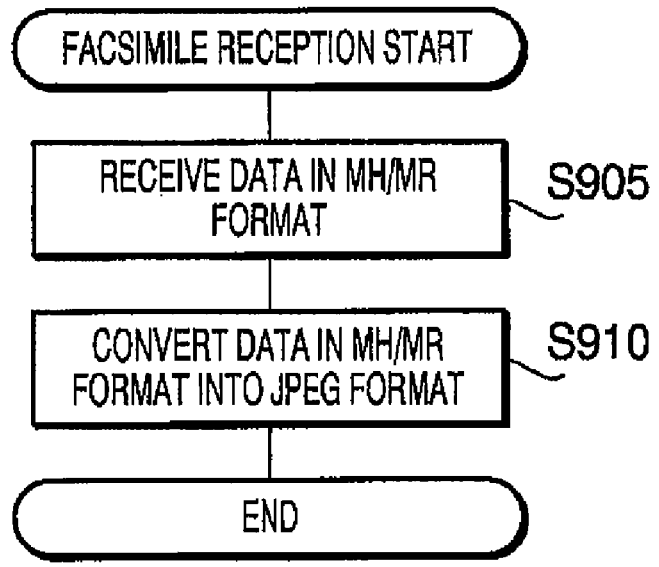
FIG. 9 is a flow chart showing a facsimile reception process executed by an MFP included in the network system of the third embodiment.

First, upon reception of facsimile data transmitted via the telephone network 40 (see (1) in FIG. 8), the MFP 10 executes a facsimile reception process shown in a flow chart of FIG. 9.

In the facsimile reception process of FIG. 9, the MFP 10 receives facsimile data in the MH/MR format (general compression format for facsimile data) (S905) and temporarily stores the received facsimile data in a buffer in the RAM of the control unit 100.

Subsequently, in order to transfer the facsimile data to the television set 20 connected to the LAN 30, the control unit 100 converts the facsimile data in the MH/MR format stored in the buffer into image data in the JPEG format (S910). The conversion is made so as to convert the facsimile data into a data format (e.g. JPEG) that can be processed by the television set 20 as a network-compatible device.

The converted facsimile data (JPEG image data) is transmitted to the television set 20 as a facsimile image file F2 (see (2) in FIG. 8), by which the facsimile image file F2 is stored in the facsimile folder 110b of the storage unit 212 of the television set 20. The television set 20 (control unit 200) generates thumbnail image data in the JPEG format, to be displayed on the file selection screen to specify the facsimile image file F2 in the JPEG format, based on the facsimile image file F2, and stores the generated thumbnail image data in the storage unit 212, by which a thumbnail image according to the thumbnail image data (representing the facsimile image file F2) is displayed in the facsimile display area H2 of the file selection screen shown in FIG. 3.

Subsequently, the facsimile data in the MH/MR format temporarily stored in the buffer in the RAM of the control unit 100 of the MFP 10 is deleted.

Incidentally, the thumbnail displayed on the file selection screen can either be a reduced display of the facsimile image file F2 (JPEG image data) or an icon designed specifically for facsimile images, as long as each thumbnail on the file selection screen is associated with a facsimile image file F2 stored in the facsimile folder 110b of the storage unit 212 so that the facsimile image file F2 can be specified by the thumbnail. The correspondence between the facsimile image file F2 and the thumbnail (thumbnail image) specifying the facsimile image file F2 is recorded and stored in the storage unit 212 of the television set 20 as shown in FIG. 12. It is also possible to configure the MFP 10 to generate the thumbnail (thumbnail image data) simultaneously with the conversion of the received facsimile data into the JPEG format and transmit the generated thumbnail image data to the television set 20, instead of configuring the television set 20 to generate the thumbnail image data.

When a thumbnail is selected by the user from the facsimile display area H2 by operating the operation unit 206, a facsimile image file F2 specified by the selected thumbnail is read out from the facsimile folder 110b of the storage unit 212 of the television set 20, by which the facsimile data (JPEG image data) contained in the facsimile image file F2 is displayed on the display unit 208 of the television set 20 to be browsed by the user. The user is also allowed to edit the displayed facsimile data by adding characters, illustrations, etc. to the facsimile data by operating the operation unit 206 (see (3) in FIG. 8). The edited facsimile data (edited JPEG image data) is stored in the facsimile folder 110b of the storage unit 212 as an updated facsimile image file F2 when the storage (saving) of the edited facsimile data is instructed by the user. At the same time, new thumbnail image data is generated from the updated (edited) facsimile data, by which the thumbnail image displayed in the facsimile display area H2 is updated.

Subsequently, when the user of the network system 1 selects a thumbnail of a file (as an object of facsimile transmission) from the file selection screen by operating the operation unit 206 of the television set 20 (e.g. by clicking on the thumbnail) and drags and drops the selected thumbnail onto the facsimile transmission icon I1 in the facsimile display area H2 (see (4) in FIG. 8), the user operation is reported to the MFP 10 as a facsimile transmission instruction regarding the facsimile image file F2 (stored in the facsimile folder 110b of the storage unit 212) specified by the selected thumbnail, and the specified facsimile image file F2 is transmitted to the MFP 10 (see (5) in FIG. 8).

The MFP 10, starting the facsimile transmission process in response to the facsimile transmission instruction, transmits a facsimile destination request (inquiring about the destination of the facsimile transmission of the selected facsimile image file F2) to the television set 20 (see (6) in FIG. 8), by which a display for prompting the user to input the telephone number of the destination is made on the display unit 208. When the destination telephone number is inputted by the user through the operation unit 206 of the television set 20 (see (7) in FIG. 8), data representing the destination telephone number is transmitted to the MFP 10 (see (8) and (9) in FIG. 8).

The MFP 10 converts the facsimile image file F2 received from the television set 20 from the JPEG format into the MH/MR format for the facsimile transmission (see (10) in FIG. 8) and executes the facsimile transmission by originating a call to the destination telephone number (see (11) in FIG. 8). After the facsimile transmission is completed, the MFP 10 transmits a notification (indicating the completion of facsimile transmission) to the television set 20 (see (12) in FIG. 8). The television set 20 receiving the notification informs the user of the completion of facsimile transmission by displaying a message, etc. on the display unit 208.

As described above, in the third embodiment, the data stored in the facsimile folder 110b of the storage unit 212 of the television set 20 are restricted to data in the JPEG format, by which memory consumption of the storage unit 212 can be saved efficiently. Further, the MFP 10, which has only to convert and transfer the received facsimile data, is relieved of the need of having a large storage capacity.

Figure 10:
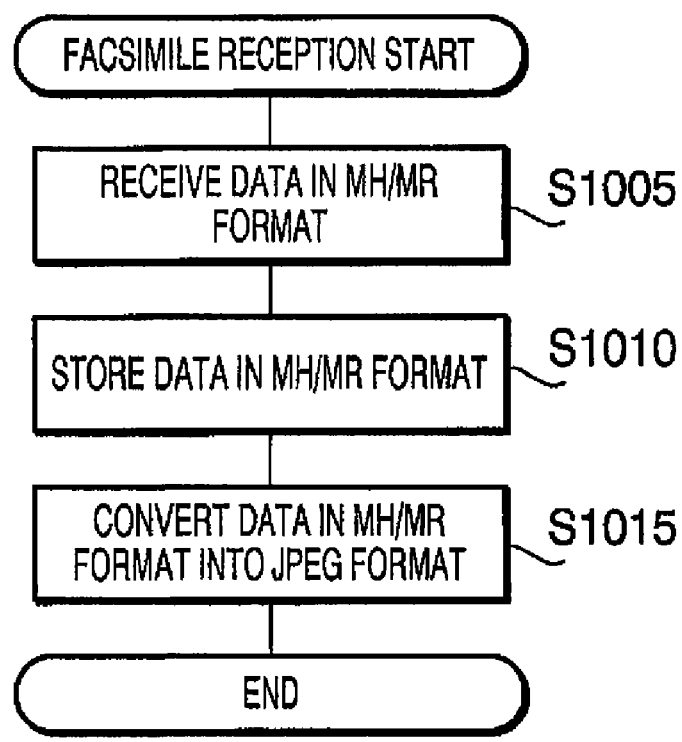
FIG. 10 is a flow chart showing another example of the facsimile reception process executed by the MFP in the third embodiment.

The facsimile reception process of FIG. 9 may be executed differently as shown in a flow chart of FIG. 10, for example. In the facsimile reception process of FIG. 10, the MFP 10 receiving facsimile data in the MH/MR format via the telephone network 40 (S1005) stores the received facsimile data in the facsimile folder 110b of the storage unit 110 (S1010) and generates image data in the JPEG format from the facsimile data by executing the data conversion (S1015). In this case, the JPEG image data (converted facsimile data) is transmitted from the MFP 10 to the television set 20. The television set 20 receiving the JPEG image data generates thumbnail image data in the JPEG format, to be displayed on the file selection screen to specify the JPEG image data (converted facsimile data) and the facsimile data in the MH/MR format (before the conversion), based on the JPEG image data. Meanwhile, the MFP 10 records and stores the correspondence among the thumbnail (thumbnail image data), the JPEG image data specified by the thumbnail, and the facsimile data in the MH/MR format specified by the thumbnail in the storage unit 110 as shown in FIG. 13. With the above configuration, when the user at the television set 20 selects a thumbnail and performs the operation for issuing the facsimile transmission instruction for transmitting a piece of facsimile data (facsimile image file F2) to another facsimile machine with no editing or processing of the JPEG image data (corresponding to the facsimile data) received from the MFP 10 and stored in the television set 20, the transfer of the JPEG image data from the television set 20 to the MFP 10 and the conversion of the JPEG image data into the MH/MR format by the MFP 10 before the facsimile transmission become unnecessary since the facsimile image file F2 (specified by the selected thumbnail according to the correspondence) has already been stored in the storage unit 110 of the MFP 10. Thus, the need of transferring JPEG image data from the television set 20 to the MFP 10 on each facsimile transmission is eliminated, by which the data traffic on the LAN 30 and the processing load on the MFP 10 for the data conversion (from the JPEG format to the MH/MR format) can be reduced.

On the other hand, when a piece of facsimile data (JPEG image data stored in the storage unit 212 of the television set 20) selected by the user for facsimile transmission has already been edited or processed, the edited/processed JPEG image data is transferred from the television set 20 to the MFP 10 and the facsimile transmission is executed by the MFP 10 by converting the edited/processed JPEG image data into the MH/MR format.

Fourth Embodiment

While the MFP 10 in the first embodiment is configured to store the JPEG image data (obtained by the conversion from the received facsimile data in the MH/MR format) in the facsimile folder 110*b* of the storage unit 110 without retaining the facsimile data in the MH/MR format, the MFP 10 may also be configured to execute the data storage reversely. In a fourth embodiment described below, the MFP 10 stores the facsimile data in the MH/MR format only, and makes the conversion into the JPEG format only when the facsimile data should be transmitted to the television set 20. Specifically, the MFP 10 receiving facsimile data in the MH/MR format via the telephone network 40 stores the received facsimile data in the facsimile folder 110*b* of the storage unit 110, generates thumbnail image data in the JPEG format (to be displayed on the file selection screen on the display unit 208 to specify the facsimile data in the MH/MR format) based on the facsimile data, and transmits the thumbnail image data to the television set 20. The correspondence between the thumbnail (thumbnail image data) and the facsimile data in the MH/MR format (before the conversion) specified by the thumbnail is recorded and stored in the storage unit 110. Therefore, a selection of a thumbnail from the file selection screen causes a selection of a piece of facsimile data in the MH/MR format (specified by the thumbnail) based on the correspondence stored in the storage unit 110.

Figure 11:
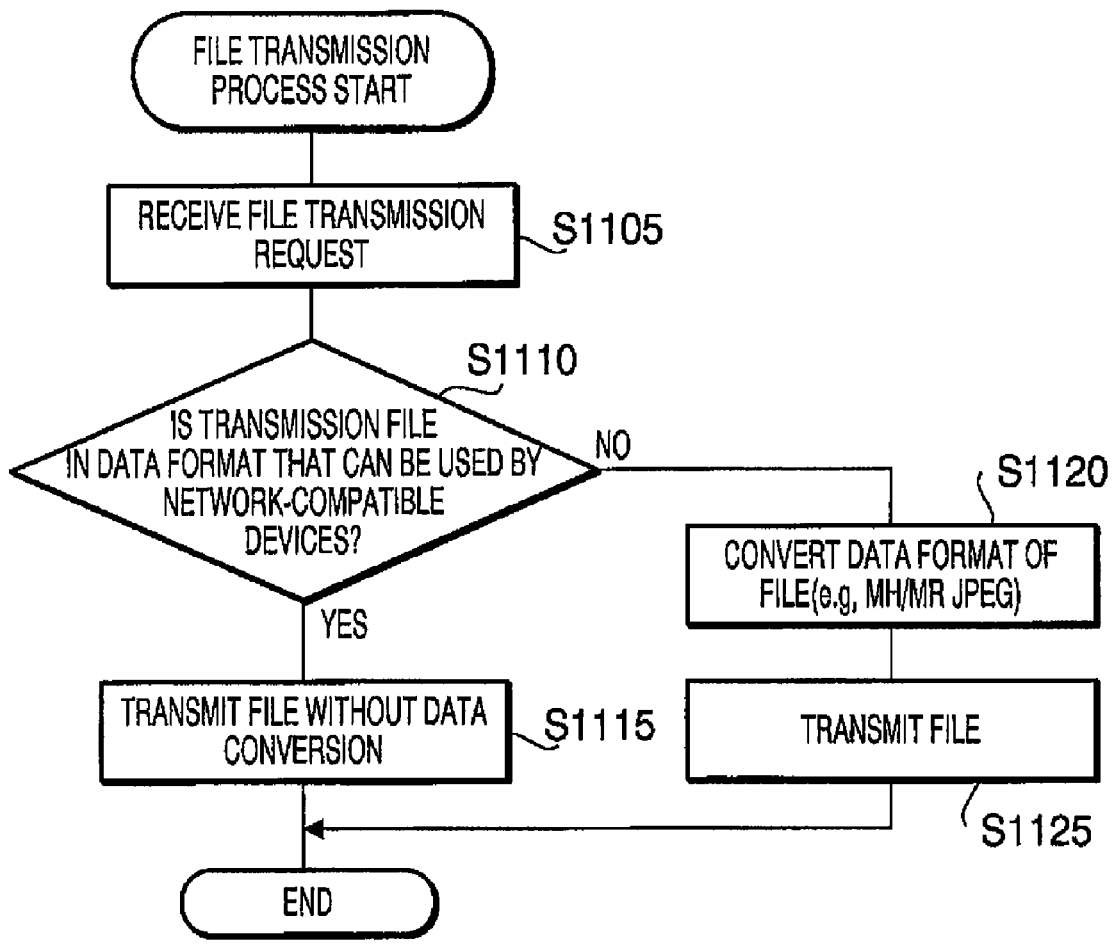
FIG. 11 is a flow chart showing a file transmission process executed by an MFP included in a network system in accordance with a fourth embodiment of the present invention.

Thereafter, when a thumbnail is selected by the user from the file selection screen by operating the operation unit 206 of the television set 20, the MFP 10 receives the selection information (representing the thumbnail selected by the user for browsing, editing, etc. of a file) sent from the television set 20 and sends back the file corresponding to the selection information to the television set 20 similarly to the first embodiment (see (5) in FIG. 5). In this case, the MFP 10 is desired to execute a file transmission process like the one shown in FIG. 11. The file transmission process of FIG. 11 is a process for converting a file into a file in a data format that can be used (processed) by network-compatible devices on the LAN 30 when the file to be transmitted is in a data format that can not be processed by the network-compatible devices.

First, when a file transmission request (caused by the selection of a thumbnail from the file selection screen) is received from the television set 20 (S1105), the control unit 100 of the MFP 10 judges whether or not the data format of the file stored in the storage unit 110 corresponding to the selected thumbnail is one that can be used (processed) by network-compatible devices on the LAN 30 (S1110). When the data format is judged to be one (JPEG, etc.) that can be used by the network-compatible devices (S1110: YES), the control unit 100 transmits the file corresponding to the selected thumbnail to the television set 20 without making the data conversion (S1115). This corresponds to, for example, a case where the editing process ((6), (7) in FIG. 5) has been executed and the edited facsimile data (edited JPEG image data) has been stored (without the data conversion into the MH/MR format) in the facsimile folder 110*b* of the storage unit 110 as an updated facsimile image file F2.

On the other hand, when the data format is judged not to be one that can be used by the network-compatible devices (S1110: NO), the control unit 100 converts the file corresponding to the selected thumbnail into a data format (JPEG, etc.) that can be used by the network-compatible devices (S1120) and transmits the converted data (converted file) to the television set 20 (S1125).

In the above process, thanks to the judgment of S1110, the MFP 10 is prevented from further executing the data conversion (to the data format that can be used by the network-compatible devices) in vain for a file already in the data format that can be used by the network-compatible devices.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while the storage unit 110 is included in the MFP 10 and/or the storage unit 212 is included in the television set 20 in the network system 1 in the above embodiments, the network system 1 may also be provided with a storage device (including the storage unit 110 or the storage unit 212) on the LAN 30 separately from the MFP 10 and the television set 20. Specifically, the storage device may be configured to include the storage unit 110 or 212, a control unit for controlling the operation of the whole storage device, and a communication unit for executing data communication with the MFP 10 and the television set 20 via the LAN 30.

While the facsimile folder 110*b* is included in the image folder 110*a* in the folder configuration (see FIG. 2) in the above embodiments, the facsimile folder 110*b* may also be formed outside (separately from) the image folder 110*a*. It is also possible to store the facsimile image files F2 in the image folder 110*a*, without forming the facsimile folder 110*b* in the storage unit 110.

While the facsimile virtual file F20 (to be used for displaying the facsimile icon I1) is stored in the facsimile folder 110*b* in the above embodiments, the facsimile virtual file F20 may also be stored in a folder other than the facsimile folder 110*b*. For example, the facsimile virtual file F20 may be stored in a folder (in the storage unit 110 or the storage unit 212) other than the image folder 110*a*, the audio folder 110*c* or the video folder 110*d* that is in the same hierarchical stage as the folders 110*a*, 110*c* and 110*d*. By such placement of the facsimile virtual file F20, the facsimile icon I1 is displayed in an area of the file selection screen outside the photo display area H1, the facsimile display area H2, the audio display area H3 and the video display area H4.

While facsimile data (image data) is taken as an example of data outputted to an output device (e.g. the television set 20) in the above embodiments, the data outputted to the output device can also be audio data, video data, etc. In such cases, the output device can be a device other than a television set, such as an audio device (e.g. stereo).

While a file corresponding to (specified by) a thumbnail is read out from the storage unit 110 or 212 and displayed on the display unit 208 of the television set 20 when the thumbnail (on the file selection screen displayed on the display unit 208) is selected by the user by operating the operation unit 206 in the above embodiments, it is also possible to let the control unit 100 of the MFP 10 transmit JPEG image data (obtained by the data conversion of the facsimile data received from outside the LAN 30) to the television set 20 and let the television set 20 immediately display the JPEG image data on the display unit 208 even when no thumbnail is selected by the user from the file selection screen. With such a configuration, the reception of the facsimile data and the contents of the facsimile data can be quickly reported to the user, by which the user is allowed to check the contents of the facsimile data immediately after the reception of the facsimile data by the MFP 10 without the need of selecting the thumbnail specifying the facsimile data from the file selection screen.

What is claimed is:

1. A network system, comprising:
a communication device configured to execute facsimile communication with an external communication device via a first network;
an image display device configured to, display images,
wherein the communication device and the image display device are connected with each other via a second network,
wherein the communication device includes:
- a first communication unit which executes the facsimile communication with the external communication device via the first network;
- a second communication unit which communicates with the image display device via the second network;
- a storage unit configured to store image data and non-image data which includes at least one of sound data and video data, and wherein the storage unit further stores transmission instruction image data which is displayed on the image display device and which represents a facsimile transmission instruction image to be selected by the image display device to cause the first communication unit to execute the facsimile communication, while associating the transmission instruction image data with the image data;
- a conversion unit configured to convert the image data into data having a data format capable of being transmitted in facsimile communication;
- a first communication control unit configured to control the first communication unit;
- a second communication control unit configured to control the second communication unit to transmit, to the image display device, first identification image data representing a first identification image which identifies the image data, second identification image data representing a second identification image which identifies the non-image data, and the transmission instruction image data,
wherein the first communication control unit configured such that, in response to receiving, from the image display device, a facsimile transmission instruction to transmit, in facsimile communication, the image data identified by the first identification image through selection of the first identification image and the facsimile transmission instruction image displayed on the image display device, the first communication control unit controls the first communication unit to transmit data converted by the conversion unit based on the identified image data to the external communication device via the first network,
wherein the image display device includes:
- an image display device side communication unit which communicates with the communication device via the second network;
- an image display unit configured to display the first identification image, the second identification image and the facsimile transmission instruction image based on the first identification image data, the second identification image data and the transmission instruction image data, while associating the facsimile transmission instruction image with the first identification image identifying the image data based on a correspondence between the image data and the transmission instruction image data stored in the storage unit;
- a selection unit configured to select the first identification image and the facsimile transmission instruction image displayed by the image display unit; and
- a display device side communication control unit configured to control the display device side communication unit to transmit the facsimile transmission instruction to the communication device in response to selection of the first identification image and the facsimile transmission instruction image through the selection unit.

2. A communication device capable of communicating with an image display device via a first network and capable of communicating with an external communication device via a second network, the image display device including:
- a display device side communication unit configured to communicate with an external device via the first network;
- an image display unit configured to display a first identification image, a second image and a third identification image, based on data obtained from the external device via the first network, while associating the first identification image identifying first image data with the second image represented by second image data based on a correspondence between the first image data and the second image data;
- a selection unit configured to select the first identification image and the second image displayed on the image display device; and
- a display device side communication control unit configured to control the display device side communication unit to transmit a facsimile transmission instruction to the external device in response to selection of the first identification image and the second image by the selection unit,
the communication device comprising:
- a first communication unit configured to communicate with the image display device via the first network;
- a second communication unit configured to execute the facsimile communication with the external communication device via the second network;
- a storage unit configured to store image data and non-image data which includes at least one of sound data and video data, wherein the storage unit defines the image data as the first image data and defines, as the second image data, transmission instruction image data representing the second image which is displayed on the image display device and is selected by the image display device to cause the second communication unit to execute the facsimile transmission, and where in the first image data and the second image data are stored while being associated with each other;
- a conversion unit configured to convert the image data into data having a data format capable of being transmitted in facsimile communication;
- a first communication control unit configured to control the first communication unit to transmit, to the image display device, first identification image data representing the first identification image identifying the first image data, third identification image data representing the third identification image identifying the non-image data, and the second image data;
- a second communication control unit configured to control the second communication unit such that, in response to receiving, from the image display device, a facsimile transmission instruction to transmit, in facsimile communication, the image data identified by the first identification image through selection of the first identification image and the second image displayed on the image display device, the second communication control unit controls the second communication unit to transmit data converted by the conversion unit based on the identified image data to the external communication device via the second network.

3. The communication device according to claim 2, wherein the first communication device controls the first communication unit to transmit a request for input of a destination telephone number to the image display device, in response to receipt of the facsimile transmission instruction from the image display device.

4. The communication device according to claim 2, wherein the first communication device transmits a transmission completion notification to the image display device in response to completion of the facsimile transmission in accordance with the received facsimile transmission instruction.

5. A computer readable medium having computer readable instructions stored thereon, which, when executed by a computer functioning as a communication device capable of communicating with an image display device via a first network and capable of communicating with an external communication device via a second network, configures the computer to:

communicate, through a first communication unit of the communication device, with the image display device via the first network;

execute, through a second communication unit of the communication device, facsimile communication with the external communication device via the second network;

store image data and non-image data which includes at least one of sound data and video data, and further define the image data as first image data and define, as second image data, transmission instruction image data representing the second image which is displayed on the image display device and is selected by the image display device to cause the second communication unit to execute the facsimile transmission, wherein the first image data and the second image data are stored while being associated with each other;

convert the image data into data having a data format capable of being transmitted in facsimile communication;

control the first communication unit to transmit, to the image display device, first identification image data representing the first identification image identifying the first image data, third identification image data representing a third identification image identifying the non-image data, and the second image data; and control the second communication unit to transmit data converted based on the identified image data to the external communication device via the second network, in response to receiving, from the image display device, a facsimile transmission instruction to transmit, in facsimile communication, the image data identified by the first identification image through selection of the first identification image and the second image displayed on the image display device.

\* \* \* \* \*